Patented Apr. 4, 1950

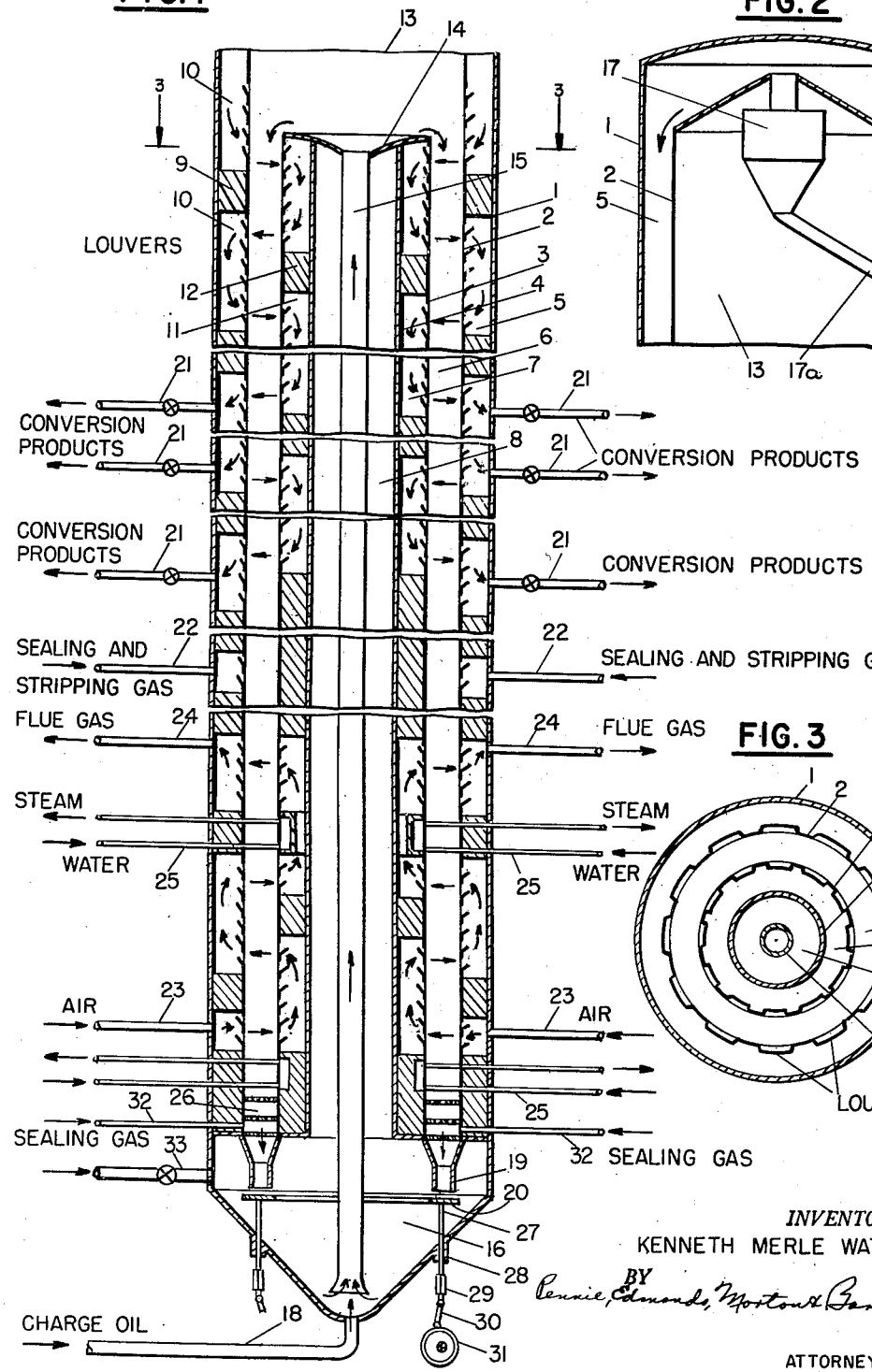
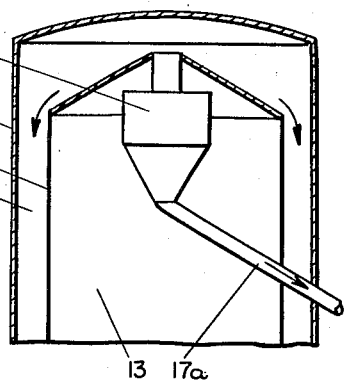
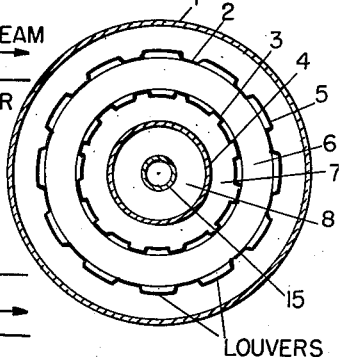

2,503,013

UNITED STATES PATENT OFFICE 2,503,013

APPARATUS FOR PYROLYTIC CONVERSION OF HYDROCARBONS

Kenneth Merle Watson, Madison, Wis., assignor to Sinclair Refining Company, New York, N. Y., a corporation of Maine Application June 27, 1947, Serial No. 757,646

7 Claims. (Cl. 23—288)

This invention relates to the pyrolytic conversion of hydrocarbons and provides an improved apparatus especially adapted to the carrying out of such pyrolytic conversion processes involving the use of a solid catalyst.

In such operations, a carbonaceous deposit is formed on the solid catalyst during the hydrocarbon conversion and the catalyst must be periodically regenerated to restore its catalytic effectiveness.

In one method of operation previously proposed, the hydrocarbons to be converted are passed continuously upwardly through a downwardly gravitating bed of catalyst in granular or pelleted form in a vertically elongated conversion chamber of large transverse dimensions, the catalyst being continuously withdrawn from the lower end of the chamber, regenerated, and returned to the upper end of the chamber. The regeneration is effected by burning off the carbonaceous deposit by passing the hot catalyst downwardly through a similar vertically elongated chamber countercurrent to a stream of air.

Such operations have entailed expensive and troublesome mechanical elevator means for conveying the catalyst from the lower end of the conversion chamber to the top of the regenerating chamber and again from the lower end of the regenerating chamber to the top of the conversion chamber. Difficulties have also been experienced in effecting uniform contact between the hydrocarbon vapors and the catalyst by reason of the tendency of the vapors to channel upwardly through the bed of catalyst. Similar difficulties have been experienced in the regeneration of the catalyst. The present invention provides an improved apparatus whereby those difficulties are avoided.

The apparatus of my present invention is especially adapted to the carrying out of the process described and claimed in my copending application Ser. No. 757,639, filed concurrently herewith, according to which the catalyst at an elevated temperature is caused to gravitate as a continuous, vertically elongated bed or column downwardly through a vertically elongated chamber having at least one relatively narrow horizontal dimension. The catalyst is passed from the bottom of the column into a stream of hydrocarbon vapors to be processed and is caught up by the vapors and carried in suspension upwardly into an enlarged chamber positioned at an elevation higher than the upper end of the elongated chamber, and in which the catalyst drops out of suspension and flows therefrom by gravity onto the upper end of the catalyst bed. The hydrocarbon vapors separated from the catalyst pass from the enlarged chamber and are repeatedly passed back and forth through the upper portion of the hot catalyst bed, at progressively different elevations, whereby conversion of the hydrocarbons is effected with the resultant deposition of carbonaceous material on the catalyst. Air, or other oxidizing gas, is similarly passed back and forth through the lower portion of the hot catalyst bed, with a resultant burning off from the catalyst of the carbonaceous deposit formed thereon by the hydrocarbon conversion in the upper portion of the column. The hot regenerated catalyst is withdrawn from the lower portion of the chamber, suspended in hydrocarbon vapors, and returned to the upper end of the catalyst bed as just described. Heat for effecting the conversion is supplied in large measure, at least, by the burning of the carbonaceous deposit. Additional heat may be supplied where required by preheating the hydrocarbon charge oil vapors.

The hydrocarbon vapors to be converted may be passed through the catalyst bed at progressively higher or progressively lower levels, that is, in a generally countercurrent, or generally concurrent, direction with respect to the direction of catalyst flow. Similarly, air for the regeneration of the catalyst may be passed through the lower portion of the catalyst bed at progressively higher, or progressively lower levels. Due precaution should be taken, however, to minimize intermixing of the gases and vapors.

According to one method of operation specifically described in said application, the hydrocarbon vapors are repeatedly passed through the column of catalyst at progressively lower levels in the upper portion of the catalyst bed and the regenerating air is passed through the catalyst at progressively higher levels in the lower portion of the catalyst bed. By this procedure, a zone of lower pressure is created at the intermediate portion of the bed, both with respect to the conversion section and the regenerating section, and the tendency for the gases and vapors to become intermixed is thereby minimized. It is also particularly advantageous to inject an inert sealing gas into the zone intermediate the conversion and regenerating sections. This serves, further, to minimize the mixing of combustion gases and hydrocarbon vapors and also serves as a stripping medium for stripping from the spent catalyst readily vaporizable hydrocarbons.

A large amount of heat is liberated in the burning of the carbonaceous deposit and care should be exercised to avoid over-heating of the catalyst. It is frequently advantageous to extract heat from the bed of catalyst undergoing regeneration in an amount sufficient to avoid excess temperatures. For this purpose cooling coils are, with advantage, provided in the regenerating zone adapted to the passage of water, or other cooling fluid therethrough.

Further, catalyst fines are frequently formed by attrition of the catalyst during repeated circulation through the system and it is usually desirable to remove these fines to avoid their excessive accumulation. My present invention provides means for removing fines from the catalyst cycle and contemplates several advantageous methods of accomplishing this end, as will be subsequently described.

By proper control of the rate of downward flow of the catalyst bed and coordinating therewith the rate of flow and number of passes of the hydrocarbon vapors and regenerating air therethrough, the catalyst will be substantially spent and ready for regeneration by the time it reaches the lower end of the reaction zone and will be completely regenerated upon reaching the lower end of the regenerating zone.

The optimum rate of downward flow of the catalyst bed will depend primarily upon the type of catalyst employed, the type of hydrocarbon being converted, operating temperatures, the rate of hydrocarbon feed, the extent of the required reaction, the depth of cracking, for instance, the number of passes through the catalyst and the thickness of the catalyst bed. The optimum rate of catalyst flow for any particular operation is readily determinable by simple test and is, with advantage, controlled by regulation of the flow of catalyst from the lower end of the regenerating zone by means of a suitable valve arrangement.

The present invention provides a particularly advantageous valve arrangement, presently to be described, for controlling the rate of catalyst flow. The apparatus is applicable to the carrying out of various types of hydrocarbon conversion and the invention contemplates the use of various solid catalysts in granular or pelleted form.

The apparatus of my present invention will be more particularly described and illustrated with reference to the accompanying drawing, of which:

Figure 1 of the drawings represents a vertical sectional and somewhat fragmentary view of the intermediate and lower sections of the apparatus indicating intervening sections of similar design;

Figure 2 is a vertical sectional view of the upper section; and

Figure 3 is a horizontal sectional view along the lines 3—3 of Figure 1.

The apparatus is enclosed by a cylindrical casing 1, advantageously of sheet metal and closed at its upper end. Coaxially positioned in casing 1, are cylindrical casings 2, 3, and 4 of progressively smaller diameters which, together with the outer casing, form annular chambers 5, 6, and 7 and an interior cylindrical chamber 8. The intermediate annulus 6 is substantially unobstructed for its entire height. The outer annulus 5 is completely obstructed by a plurality of vertically spaced partitions 9 of considerable depth forming a plurality of vertically spaced chambers 10. The inner annulus 7 is similarly divided into a plurality of vertically spaced chambers 11 by similar partitions or spacers 12.

Each of the chambers 10 and 11 communicates with the annulus 6 through louvers, the slats of which project upwardly and outwardly from the annulus 6 into the respective chambers.

The casings 2, 3, and 4 terminate short of the upper end of the cylinder formed by casing 1 so as to form an enlarged cylindrical chamber 13 in the upper part of the apparatus. The annulus 6 is in open communication at its upper end with chamber 13. The upper ends of the uppermost chamber 11 and the upper end of the inner cylinder 8 are closed off from chamber 13 by means of partition 14. An elevator conduit 15 extends upwardly through the inner chamber 8 and leads into chamber 13 through an opening in partition 14. The lower end of elevation conduit 15 opens into the conical hopper 16, forming the lower end of the apparatus, and is flared somewhat at its lower end. The upper end of annulus 5 is connected with the upper end of chamber 13 through separator 17.

The spacers or partitions 9 and 12 are, with advantage, positioned somewhat as shown in the drawing so as to form chambers 10 and 11 in staggered positions such that the lower end of a given chamber 10 is directly opposite the upper end of the next next lower chamber 11 and that the lower end of said chamber 11 is directly opposite the upper end of the next lower chamber 10. The spacers 9 and 12 are, for clarity, shown in the drawing as solid sections, but it will be understood that they may be either solid or hollow. Further, for reduction in weight and metal used in fabrication, the respective casings 1 and 4 may be discontinuous at the points of the respective spacers.

In operation, the annulus 6 is filled with granular catalyst, for instance, by charging the catalyst through an opening, not shown, in the top of the apparatus, adapted to be sealed in operation.

Vaporized or partially vaporized hydrocarbon oil to be processed is charged through lines 18 into the lower end of hopper 16 directly beneath the lower flared end of elevator conduit 15 and picks up in suspension catalyst which has passed downwardly into the hopper 16 from the lower end of the column of catalyst through the annulus 19 at a rate controlled by adjustable valves 20, subsequently described. The catalyst is entrained in the stream of hydrocarbon vapors and jetted upwardly into elevator conduit 15.

The hydrocarbon vapors carrying the catalyst in suspension pass upwardly through elevator conduits 15 into chamber 13 wherein the catalyst drops out of suspension by reason of decreased velocity of the vapors and falls onto a bed of catalyst maintained in chamber 13 from which the catalyst flows into the annulus 6, keeping it continuously filled with the catalyst.

The separated hydrocarbon vapors pass from chamber 13 through separator 17, for the separation of catalyst fines, and from thence through annulus 5 into the upper end of the uppermost chamber 10 and, from thence, the vapors pass by way of the louvers through the body of catalyst in annulus 6 and into the upper portion of the uppermost chamber 11. Separated catalyst fines pass from the separator 17 through conduit 17a to a point without the system. From the lower portion of said chamber 11, the vapors pass back through the body of catalyst into the chamber 10, and so back and forth through the body of catalyst, at progressively lower levels, until the vapors reach an intermediate chamber 10 from which they are withdrawn through one of the lines 21 to fractionating apparatus, not shown.

In the drawing a plurality of conversion product drawoff lines 21 are shown leading from progressively lower chambers 10. This is advantageous as it permits withdrawal of conversion products at selective levels from the reaction zone thereby varying the space velocities of the operation and also varying the depth of the intermediate sealing and stripping zone, subsequently described.

The catalyst which has been substantially spent, continues downwardly through annulus 6 and is stripped of readily vaporizable hydrocarbons remaining thereon by a stripping gas or vapor, steam, for instance, introduced into a still lower chamber 10 through lines 22.

Air is passed into the lowermost chamber 10 through lines 23, flows therefrom by way of the louvers through the bed of catalyst into the lowermost chamber 11 and back through the catalyst into the next higher chamber 10, and so passed back and forth through the catalyst, at progressively higher levels, until it reaches an intermediate chamber 10, below that into which the stripping medium is injected, and the flue gases pass therefrom through conduits 24 to a stack, not shown in the drawing.

The air passing in contact with the hot catalyst results in the burning therefrom of the carbonaceous deposit formed on the catalyst during the hydrocarbon conversion. Excess heat may be extracted from the catalyst undergoing regeneration by means of cooling coils 25, extending through the bed of catalyst in annulus 6, and through which a cooling medium is circulated. For instance, water may be circulated through the cooling coils and thereby converted into steam. Any number of cooling coils required may be used to extract from the catalyst an amount of heat necessary to prevent excessive temperatures.

The regenerated catalyst passes from the lower end of the regenerating zone through perforations in a series of distributing plates 26 so positioned as to permit the flow of catalyst therethrough at a retarded rate dependent upon the angle of repose of the catalyst, as understood by the art. From thence, the catalyst flows through annulus 19, past valve 20 and falls into the hopper 16 where it is picked up by the entering charge oil, as previously described.

The rate of flow of the catalyst through annulus 19 is controlled by valve mechanism comprising an annular flat ring member 20 of somewhat greater width than annulus 19. This ring 20 is adjustably supported by a plurality of shafts 27 extending downwardly through the wall of the hopper 16 and sealed by suitable glands indicated on the drawing at 28. The length of the shafts 27 may be adjusted by means of turn buckles 29 and further the lower ends of the shafts are connected by linkages 30 to eccentrics 31. The eccentrics are connected by suitable conventional means, not shown, so that they will operate together to impart an oscillatory movement to ring 20, adjustments in leveling the member 20 and of its distance from the lower end of annulus 19 being made by the turn buckles 29 interposed in the shafts 27.

In the valve arrangement shown, the ring 20 will completely shut off the flow of catalyst without requiring mechanical seating of the valve. By raising the ring to a point where its edges intercept the angle of repose of the catalyst flowing from annulus 19, flow is completely stopped. This method of flow control is particularly advantageous as it avoids crushing the catalyst. The rate of catalyst flow is determined by the height of the ring and the oscillatory motion maintains uniform flow at all points around the annulus 19.

An inert sealing gas is introduced into the lower end of the annulus 6 through lines 32 so as to maintain therein a pressure sufficient to prevent the downward flow of regeneration air into the hopper 16 or the upward flow of oil vapors into the regenerating zone. The depth of catalyst bed above and below the point of sealing gas introduction should be sufficient to permit maintenance of such pressure without excessive gas flow in either direction.

Fresh catalyst may be supplied to the cycle as required during operation through conduits 33 to replace catalyst removed by the elutriator.

The thickness of the annulus 6 may be varied over a considerable range, the optimum thickness depending upon the particular operating conditions. Generally its thickness is, with advantage, about 1 to 2 feet. The depth of the spacers 9 and 12, is, with advantage, somewhat greater than, the thickness of the bed of catalyst in annulus 6 so as to minimize any tendency of gases or vapors to pass directly from one chamber to that immediately above or below it, rather than through the catalyst bed to the opposite chamber.

For convenience, the vertical spacing between the outer and inner annular chambers, respectively, is shown, in some instances, in the drawing as only slightly greater than the thickness of the catalyst bed in annulus 6. It will be understood that the spacings are not intended to be drawn to scale and are, with advantage, of greater relative vertical dimension than shown in the drawing, advantageously being somewhat greater than the thickness of the catalyst bed, as previously noted.

With the exception of the intermediate zone, some by-passing of the gases and vapors from one zone to the next higher or lower zone, frequently, does not seriously interfere with the operation. However, mixing of air or combustion gases from the regenerating zone with the hydrocarbon vapors should usually be avoided and, for this reason, it is particularly advantageous that the spacing just above and below the regenerating zone be substantially greater than the path horizontally through the catalyst bed.

The apparatus specifically shown in the drawing provides for four to six passes of the hydrocarbon vapors and for four passes of the regenerating air through the catalyst bed. Frequently, a greater number of passes is desirable and is within the contemplation of my invention. Figure 1 of the drawing is somewhat fragmentary to indicating intervening sections of the apparatus of similar design.

The conduit for injecting sealing or stripping gas between the conversion and regenerating zones may frequently be omitted particularly where the amount of air passes through the regenerating zone is to be so controlled that upon reaching the upper end of the regenerating zone, the combustion gases are substantially free from uncombined oxygen. Under such conditions, the hot inert combustion products will serve to strip the spent catalyst and a portion of the combustion gases may be caused to pass upwardly through the stripping zone into the conversion zone by imposing a slight back pressure on the effluent flue gases by any known means. Where the sealing gas is not to be used, the section of the column into which the sealing gas would be introduced may be omitted.

The arrangements shown in the drawing for controlling the flow of catalyst from the regenerating zone and for suspending the catalyst in the entering charge oil are especially advantageous for the reason that by the use thereof a particularly uniform downward flow of the catalyst is effected and further suspension of the catalyst in the charge oil vapors is facilitated. However, in lieu thereof, other known means may be used, for instance, the catalyst may flow from the lower end of the annulus 6 into a plurality of spaced, conical members connected at their lower end with individual charge oil lines leading to the elevator conduit 15.

The elevation conduit 15 is, with advantage, of such diameter relative to the volume of hydrocarbon vapors to be charged therethrough, as to effect a high velocity of flow so as to entrain the catalyst particles and carry them upwardly into chamber 13. Generally, the superficial velocity of the rising vapors should be within a range of 10 to 50 feet per second, the optimum velocity depending in large measure upon the size and density of the catalyst particles and the relative proportion of catalyst to be carried thereby.

Also, in place of the separator shown, other elutriating methods may be employed for removing catalyst fines from the system. For instance, screens of a mesh adapted to pass the fines but retain the catalyst of desirable particle size may be used, either with or without the blowing of elutriating gas through the catalyst on the screen.

The invention contemplates the use of various types of catalyst, for instance, natural or synthetic earths, silica gels, and the like, or various inert carriers having active catalysts deposited thereon. The size of the particles of catalyst is, with advantage, of a mesh within the range of 25 to 40, though catalysts of larger and smaller particle size may be employed. Pelleted catalysts as coarse as 4 to 10 mesh may be employed. Usually, powdered catalyst, such as used in the fluid catalyst processes, is less desirable because of a tendency of the catalyst particles to be carried out of the catalyst bed along with the gases and vapors, but may be used in conjunction with relative low gas and vapor velocities through the catalyst bed.

Operating conditions are generally subject to considerable variation depending upon the particular catalyst employed and the nature and extent of the desired reaction. In cracking gas oil, for instance, using a silica-alumina type catalyst, the temperature in the reaction zone is, with advantage, maintained within the range of about 750° to 950° F. and the pressure within the range of about 10 to 15 pounds per square inch. In the regenerating zone, a temperature within the range of 900° to 1,150° F. is usually satisfactory.

The temperature in the reaction zone is controlled, in large measure at least, by the temperature of the catalyst passing from the lower end of the regenerating zone and the extent of preheat of the charge oil. The temperature of the catalyst undergoing regeneration is controlled by the extraction of heat therefrom, as previously described, any desired number of cooling coils being used for this purpose.

By the present apparatus, the extent of contact between the catalyst and the hydrocarbon vapors being converted and also the catalytic activity of the catalyst with which the hydrocarbon vapors are brought into contact may be maintained extremely uniform. Further, an exceptionally uniform and complete regeneration of the catalyst is attained. The apparatus has the advantage of high uniformity of the product, increased catalyst life and catalytic effectiveness, increased economy of operation by reason of the elimination of mechanical conveyors and also a closer control of operating conditions.

I claim:

1. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, conduit means leading upwardly into the lower end of the enlarged elevated chamber and adapted to the passage of a suspension of finely divided solids in hydrocarbon vapors thereto a connection for injecting reactant vapors into the lower end of the last said conduit, a connecting passageway between the lower end of the vertically elongated annular chamber with the lower end of the last said conduit, conduit connections to the lower and at least two intermediate vertically spaced outer chambers, respectively and a connecting passageway leading from the upper end of the enlarged elevated chamber to the uppermost of the outer vertically spaced chambers.

2. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, a connection between the lower end of the vertically elongated chamber and the lower end of the enlarger elevated chamber adapted to the passage of a suspension of finely divided solids in hydrocarbon vapors therethrough, a connecting passageway leading from the upper end of the enlarged chamber to the uppermost of the outer vertically spaced chambers, means adapted to the separating of finely divided solid particles from the reactant vapors interposed in the last said connection, conduit connections to the lower and at least two intermediate vertically spaced outer chambers, respectively, and a connection for passing hydrocarbon vapors into the lower portion of the connection leading from the lower end of the vertically elongated chamber.

3. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, conduit means leading upwardly into the lower end of the enlarged elevated chamber and adapted to the passage of hydrocarbon vapors thereto, a connection for injecting reactant vapors into the lower end of the last said conduit, a connecting passageway between the lower end of the vertically elongated annular chamber with the lower end of the last said conduit, flow control means positioned in said connecting passageway adapted to control the flow of finely divided solid material therethrough, conduit connections to the lower and at least two intermediate vertically spaced outer chambers, respectively, and a connecting passageway leading from the upper end of the enlarged elevated chamber to the uppermost of the outer vertically spaced chambers.

4. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, a hopper beneath the lower end of the vertically elongated chamber and communicating therewith through an annular connection, a coaxially positioned conduit leading upwardly into the lower end of the enlarged elevated chamber from the lower end of the hopper, conduit connections to the lower and at least two intermediate vertically spaced outer chambers, respectively, a connection between the upper end of the enlarged elevator chamber and the uppermost of the outer vertically spaced chambers and a connection for injecting hydrocarbon vapors into the lower end of the coaxially positioned conduit.

5. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, a hopper beneath the lower end of the vertically elongated chamber and communicating therewith through an annular connection, a coaxially positioned conduit leading upwardly into the lower end of the enlarged elevated chamber from the lower end of the hopper, conduit connections to the lower and at least two intermediate vertically spaced outer chambers, respectively, a connection between the upper end of the enlarged elevator chamber and the uppermost of the outer vertically spaced chambers and a connection for injecting hydrocarbon vapors into the lower end of the coaxially positioned conduit, and valve means comprising an annular ring adjustably positioned beneath the lower end of the annular connection and adapted to be oscillated vertically.

6. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, the vertical spacing between successive inner and outer chambers respectively being at least equal to the thickness of the vertically elongated annular chamber, a cooling coil positioned in the lower portion of the vertically elongated chamber, conduit means leading upwardly into the lower end of the enlarged elevated chamber and adapted to the passage of a suspension of finely divided solids in hydrocarbon vapors thereto, a connection for injecting reactant vapors into the lower end of the last said conduit connecting passageway between the lower end of the vertically elongated annular chamber and the lower end of the last said conduit, conduit connections to the lower and at least two intermediate vertically spaced outer chambers, respectively, and a connecting passageway leading from the upper end of the enlarged elevated chamber to the uppermost of the outer vertically spaced chambers.

7. Apparatus especially adapted to the conversion of hydrocarbons which comprises an enlarged elevated chamber, a coaxially positioned, vertically elongated, annular chamber extending downwardly therefrom, a plurality of outer, vertically spaced annular chambers encircling the elongated vertical chamber, a plurality of inner, vertically spaced annular chambers encircled by the inner wall of the vertically elongated chamber, the relative positions of the inner and outer vertically spaced chambers being staggered so that the upper portion of an inner chamber is opposite the lower portion of an outer chamber and the lower portion of said inner chamber is opposite the upper portion of the next lower outer chamber, each inner and outer chamber communicating with the vertically elongated annular chamber through louvers in the walls of the latter, the slats of the louvers extending upwardly into the respective vertically spaced chambers, a cooling coil positioned in the lower portion of the vertically elongated chamber, a hopper beneath the lower end of the vertically elongated chamber and communicating therewith through an annular connection, a coaxially positioned conduit leading upwardly into the lower end of the enlarged elevated chamber from the lower end of the hopper, conduit connections to the lower and at least two intermediate vertically spaced outer chambers, respectively, a connection between the upper end of the enlarged elevator chamber and the uppermost of the outer vertically spaced chambers and a connection for injecting hydrocarbon vapors into the lower end of the coaxially positioned conduit, and flow control means adapted to control the flow of finely divided solid material through said annular connection.

KENNETH MERLE WATSON.

No references cited.